(12) United States Patent
Pecquet et al.

(10) Patent No.: US 11,774,299 B2
(45) Date of Patent: Oct. 3, 2023

(54) TEMPERATURE SENSOR AND A METHOD FOR ASSEMBLING SUCH A TEMPERATURE SENSOR

(71) Applicants: MEAS France, Toulouse (FR); TE Connectivity Germany GmbH, Bensheim (DE)

(72) Inventors: Nicolas Christopher Pecquet, Toulouse (FR); Hamza Boumeddane, Toulouse (FR); Valentin Skurjatin, Bensheim (DE)

(73) Assignees: Meas France, Toulouse (FR); TE Connectivity Germany GmbH, Bensheim (DE)

( * ) Notice: Subject to any disclaimer, the term of this patent is extended or adjusted under 35 U.S.C. 154(b) by 350 days.

(21) Appl. No.: 17/226,254

(22) Filed: Apr. 9, 2021

(65) Prior Publication Data
US 2021/0223113 A1 Jul. 22, 2021

Related U.S. Application Data

(63) Continuation of application No. PCT/EP2019/077536, filed on Oct. 10, 2019.

(30) Foreign Application Priority Data

Oct. 11, 2018 (EP) ..................... 18306345

(51) Int. Cl.
*G01K 7/16* (2006.01)
*G01K 7/02* (2021.01)
*H01R 13/66* (2006.01)

(52) U.S. Cl.
CPC ............. *G01K 7/023* (2013.01); *G01K 7/16* (2013.01); *H01R 13/6683* (2013.01)

(58) Field of Classification Search
CPC .. G01K 1/14; G01K 1/08; G01K 7/16; G01K 7/023; G01K 2205/04; H01R 13/6683
See application file for complete search history.

(56) References Cited

U.S. PATENT DOCUMENTS 4,527,909 A * 7/1985 Dale .................... G01K 1/08
374/208
4,628,141 A 12/1986 Wieszeck et al.
(Continued)

FOREIGN PATENT DOCUMENTS

| JP | 2003270053 | 9/2003 | |
| JP | 6340817 B2 | 6/2018 | |
| WO | WO-2020153944 A1 * | 7/2020 | .......... B23K 37/006 |

OTHER PUBLICATIONS

PCT Written Opinion of the International Searching Authority and International Search Report, dated Mar. 11, 2020, 13 pages.
(Continued)

*Primary Examiner* — Gail Kaplan Verbitsky
(74) *Attorney, Agent, or Firm* — Barley Snyder

(57) ABSTRACT

A temperature sensor includes a temperature sensing element transducing a sensed temperature into an electrical output signal and having a plurality of electrically conductive leads, a mineral insulated cable having a plurality of conductor wires enclosed by a metal outer sheath, and an electrically insulating element. The conductor wires are insulated inside the cable and extend beyond the outer sheath. The electrically insulating element insulates the conductor wires at least partially with respect to each other and with respect to the outer sheath. The electrically insulating element has a first opening receiving the conductor wires and a second opening receiving the temperature sensing element. The electrically conductive leads are connected to the conductor wires at a junction region located within the
(Continued)

electrically insulating element. The electrically insulating element has an aperture extending up to the junction region.

19 Claims, 4 Drawing Sheets

(56) References Cited

U.S. PATENT DOCUMENTS

| | | | | |
|---|---|---|---|---|
| 5,360,269 | A * | 11/1994 | Ogawa | G01K 1/105 |
| | | | | 374/208 |
| 6,264,363 | B1 * | 7/2001 | Takahashi | G01K 7/22 |
| | | | | 374/185 |
| 7,748,898 | B2 * | 7/2010 | Toudou | G01K 1/08 |
| | | | | 338/238 |
| 10,024,726 | B2 * | 7/2018 | Yoshida | G01K 1/08 |
| 2008/0205483 | A1 * | 8/2008 | Rempe | G01K 7/02 |
| | | | | 374/E7.004 |
| 2011/0222583 | A1 | 9/2011 | Boghun et al. | |
| 2023/0096651 | A1 * | 3/2023 | Reuvers | G01K 7/22 |
| | | | | 374/185 |

OTHER PUBLICATIONS

Abstract of JP2015155829, related to JP6340817, dated Jun. 13, 2018, 1 page.

* cited by examiner

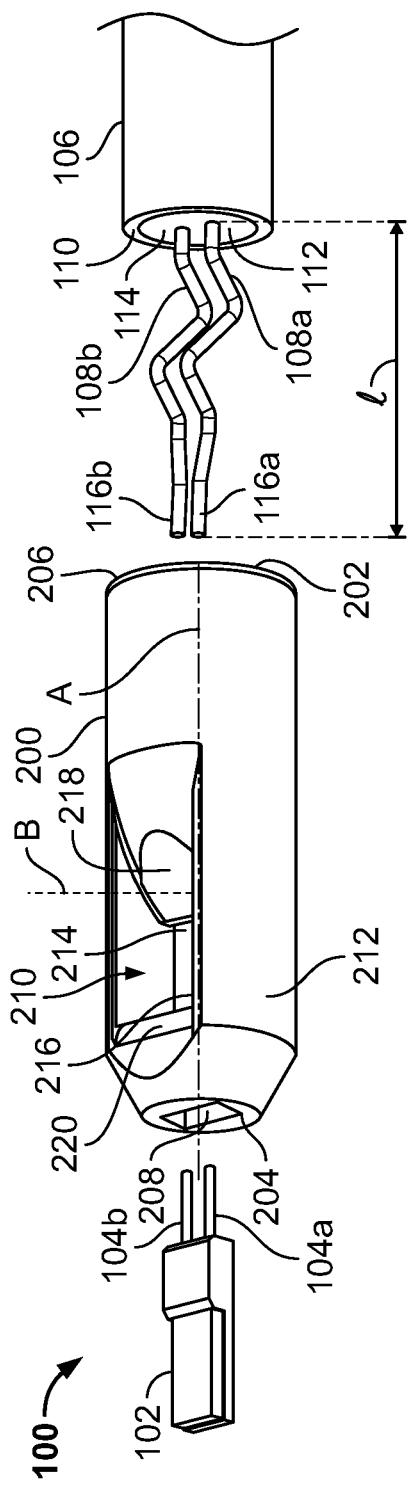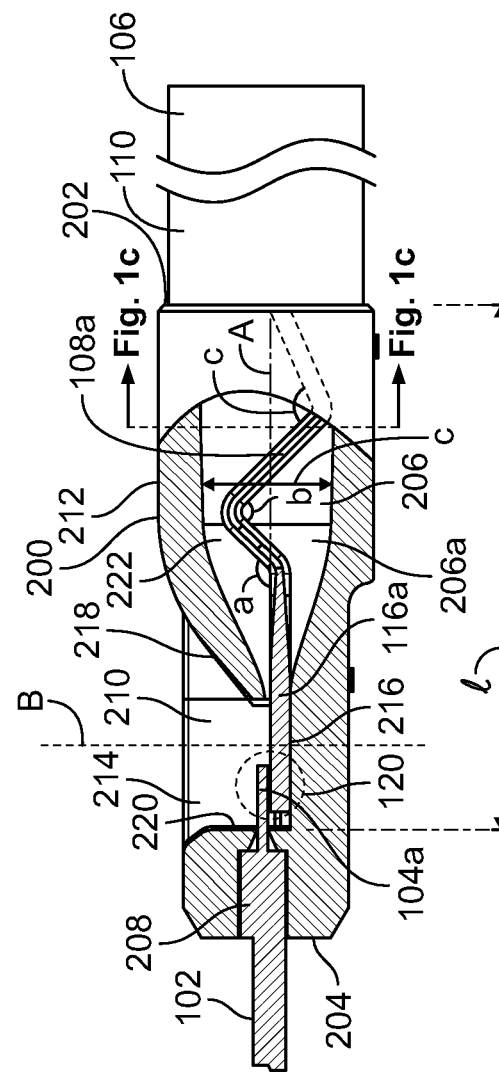
Fig. 1a
Fig. 1b

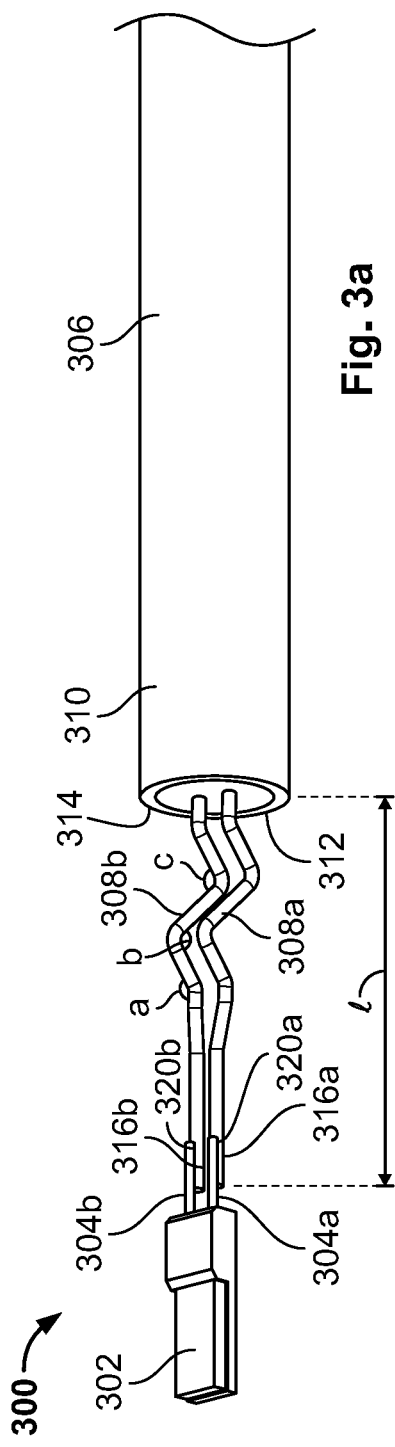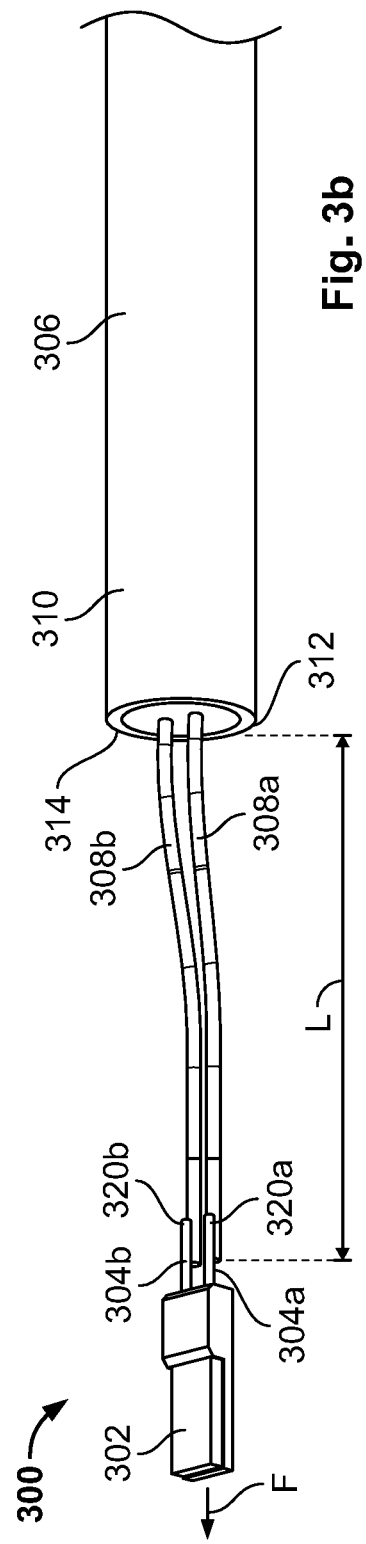

TEMPERATURE SENSOR AND A METHOD FOR ASSEMBLING SUCH A TEMPERATURE SENSOR

CROSS-REFERENCE TO RELATED APPLICATIONS

This application is a continuation of PCT International Application No. PCT/EP2019/077536, filed on Oct. 10, 2019, which claims priority under 35 U.S.C. § 119 to European Patent Application No. 18306345.2, filed on Oct. 11, 2018.

FIELD OF THE INVENTION

The present invention relates to a temperature sensor and, more particularly, to a temperature sensor having a temperature sensing element transducing a sensed temperature into an electrical output signal.

BACKGROUND

Temperature sensors include a temperature sensitive element having electrically conductive leads so as to transduce a sensed temperature into an electrical output signal. The electrical output signal is output at electrically conductive leads of the temperature sensitive element which are connected to a cable, for instance a mineral insulated cable. Such mineral insulated cables comprise conductor wires enclosed in a metal outer sheath and are insulated with respect to each other inside the cable by mineral powders, for example. In the temperature sensors, the electrically conductive leads are connected to the conductor wires which extend beyond the outer sheath of the cable at a terminal end thereof.

In automotive application environments, for instance, it is required that the temperature sensor, in particular the connection between the temperature sensing element and the cable, is robust and withstands vibrations, shocks and elevated temperatures (e.g. up to 1000° C.). Consequently, such temperature sensors usually comprise an outer protective housing that is in contact with a medium to be monitored and the space between the inner walls of the protective housing and the outer surface of the temperature sensitive element is filled with a ceramic material, such as a cement or powder.

However, there is still a need for a robust temperature sensor and for improving the electrical insulation of the conductor wires extending beyond the outer metal sheath of the cable. Indeed, there is risk of short-circuit between the conductor wires themselves extending beyond the cable as well as between the extended conductor wires and the metal sheath of the cable.

SUMMARY

A temperature sensor includes a temperature sensing element transducing a sensed temperature into an electrical output signal and having a plurality of electrically conductive leads, a mineral insulated cable having a plurality of conductor wires enclosed by a metal outer sheath, and an electrically insulating element. The conductor wires are insulated inside the cable and extend beyond the outer sheath. The electrically insulating element insulates the conductor wires at least partially with respect to each other and with respect to the outer sheath. The electrically insulating element has a first opening receiving the conductor wires and a second opening receiving the temperature sensing element. The electrically conductive leads are connected to the conductor wires at a junction region located within the electrically insulating element. The electrically insulating element has an aperture extending up to the junction region.

BRIEF DESCRIPTION OF THE DRAWINGS

The invention will now be described by way of example with reference to the accompanying Figures, of which:

FIG. 1a is an exploded perspective view of a temperature sensor according to a first embodiment of the invention;

FIG. 1b is a sectional side view of the temperature sensor of FIG. 1a;

FIG. 1c is a sectional perspective view of an electrically insulating element of the temperature sensor of FIG. 1a;

FIG. 2a is a top view of a first step of a method for assembling the temperature sensor of FIG. 1a;

FIG. 3a is a perspective view of a temperature sensor according to a second embodiment of the invention in a non-expanded state; and FIG. 3b is a perspective view of the temperature sensor of FIG. 3a in an expanded state.

DETAILED DESCRIPTION OF THE EMBODIMENT(S)

Figure 1C:
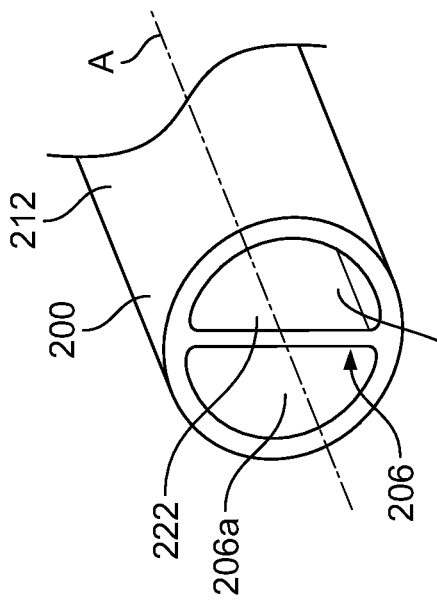

The accompanying drawings are incorporated into the specification and form a part of the specification to illustrate several embodiments of the present invention. These drawings, together with the description, serve to explain the principles of the invention. The drawings are merely for the purpose of illustrating examples of how the invention can be made and used, and are not to be construed as limiting the invention to only the illustrated and described embodiments.

Furthermore, several aspects of the embodiments may form—individually or in different combinations—solutions according to the present invention. The following described embodiments thus can be considered either alone or in an arbitrary combination thereof. Features and advantages will become apparent from the following more particular description of the various embodiments of the invention, as illustrated in the accompanying drawings, in which like references refer to like elements.

FIG. 1a shows a perspective and exploded view of a temperature sensor 100 according to a first embodiment of the present invention. Such a temperature sensor 100 can, for instance, be used for measuring an exhaust gas temperature in an automobile.

The temperature sensor 100 comprises a temperature sensing element 102, shown in FIG. 1a, that is operable to transduce a sensed temperature into an electrical output signal. In an embodiment, the temperature sensing element 102 comprises a Pt200 sensor as the actual temperature detector. Platinum sensors are particularly advantageous because of their potential accuracy and long-term stability in the high temperature range. Most platinum sensing elements are currently in the form of thin film resistors. However, it is clear for a person skilled in the art that any other miniaturized temperature sensing element can be used according to the present invention. For instance, the temperature sensing element 102 may comprise a resistive temperature detector (RTD), a thermistor or a silicon-based semi-conductor temperature sensor.

The electrical output signal is output at electrically conductive leads 104a, 104b of the temperature sensing element 102, shown in FIG. 1a. The electrically conductive leads 104a, 104b are to be connected to a cable 106.

One automotive application of high temperature sensors is measuring, for instance, the temperature of exhaust gas. This means an aggressive atmosphere that might be reductive or oxidizing, contains sulfur, nitrogen, hydrogen, oxygen, and all kinds of compounds thereof. This in, conjunction with the temperature, determines materials for housings and fittings.

The cable 106 is, in an embodiment, a mineral insulated cable 106. The mineral insulated cable 106 comprises two conductor wires 108a, 108b enclosed in a metal outer sheath 110, as shown in FIG. 1a. The two conductor wires 108a, 108b are insulated with respect to each other inside the cable 106 by powder or packed minerals 112. The outer sheath 110 protects the internal conductor wires 108a, 108b from heat, chemical or other environmental damage. The outer sheath 110 can be of stainless steel or Inconel®. The insulated packed minerals or powder 112 can be for instance made of magnesium oxide (MgO). Magnesium oxide makes an appropriate electrical insulation material because it is both chemically and physically stable at high temperatures.

At a terminal end 114 of the cable 106, shown in FIG. 1a, the two conductor wires 108a, 108b extend beyond the outer sheath 110 thereof along a length l. In the following, the term "the extended conductor wires 108a, 108b" refers to the conductor wires 108a, 108b extension of length l. The respective terminal end 116a, 116b of the extended two conductor wires 108a, 108b are to be connected with the electrically conductive leads 104a, 104b of the temperature sensing element 102.

In the embodiment shown in FIG. 1a, the cable 106 has two conductor wires 108a, 108b to be connected with two respective electrically conductive leads 104a, 104b of the temperature sensing element 102. However, the number of conductor wires of the cable 106 as well as the number of electrically conductive leads of the temperature sensing element 102 are not limited to the number of two, and could be one and more In the embodiment shown in FIG. 1a, the temperature sensor 100 further comprises an electrically insulating element 200. The electrically insulating element 200 is made of a ceramic material and has an essentially elongate cylindrical shape along its longitudinal axis A. According to an embodiment, the electrically insulating element 200 is integrally formed in one-piece. In a variant, the electrically insulating element 200 can be an assembly of at least two parts.

The electrically insulating element 200 has at each of its longitudinal ends 202, 204 a respective opening 206, 208. The first opening 206 is configured for receiving the two conductor wires 108a, 108b extending beyond the outer sheath 110 and at least partially the outer sheath of the cable 106. The second opening 208 is configured for receiving the electrically conductive leads 104a, 104b and at least partially the temperature sensing element 102. The openings 206, 208 of the electrically insulating element 200 will be described in more detail with respect to the FIG. 1b.

As shown in FIG. 1a, the electrically insulating element 200 has an aperture 210 extending from a lateral surface 212 of the elongate electrically insulating element 200 through an inside 214 of the element 200 along an axis B perpendicular to the longitudinal axis A of the element 200. The aperture 210 extends partly inside 214 the insulating element 200 to a bottom surface 216 comprising the longitudinal axis A of the element 200. Two lateral walls 218, 220 of the aperture 210 allow partly closing the respective first opening 206 and second opening 208. While the lateral wall 220 of the aperture 210 is essentially perpendicular to the lateral surface 212 of the electrically insulating element 200, the lateral wall 218 has a gentle slope descending from the lateral surface 212 towards the bottom surface 216 of the electrically insulating element 200.

FIG. 1b is a side view of the temperature sensor 100 shown in FIG. 1a in an assembled state. Elements with the same the reference numeral already described and illustrated in FIG. 1a will not be described in detail again but reference is made to their description above.

In the following, the description of the electrically conductive lead 104a and the terminal end 116a of the conductor wire 108a likewise applies to the electrically conductive lead 104b and the terminal end 116b of the conductor wire 108b, which are not visible in the side view of FIG. 1b.

In the assembled state of the temperature sensor 100 shown in FIG. 1b, the electrically conductive lead 104a of the temperature sensing element 102 is positioned such as to overlap the terminal end 116a of the conductor wire 108a of the cable 106 at a junction region 120. The connection between the temperature sensing element 102 and the cable 106 is to be realized at the junction region 120. The connection can be realized by welding, in particular by laser welding.

The junction region 120 is located inside 214 the electrically insulating element 200 and over the bottom surface 216, as shown in FIG. 1b. Hence, the aperture 210 extends up to the junction region 120. Therefore, in the assembled state, the junction region 120 is accessible from the outside of the electrically insulating element 200 by a tool and/or an operator. As a result, according to the first embodiment, the connection between the temperature sensing element 102 and the cable 106 can be realized after the temperature sensor 100 is mechanically assembled.

According to the first embodiment, the connection between the temperature sensing element 102 and the cable 106 at the junction region 120 is realized directly between each electrically conductive lead 104a, 104b and each respective conductor wire 108a, 108b. Consequently, there is only one junction region 120 and one aperture 210. Therefore, in contrast with conventional temperature sensors wherein one or more intermediate additional wires are used to connect the temperature sensing element 102 with the cable 106, the number of connections, and thus of junction regions, can be reduced. This allows improving the robustness of the temperature sensor 100 as the number of weldings is reduced, which enhances the reliability of the connection. Furthermore, by removing the necessity of using additional intermediate wires, the number of components of the temperature sensor 100 can be reduced as well as the process step associated with the intermediate wires (e.g. straightening step, welding and cutting step of the intermediate wires). Therefore, the manufacturing of such a temperature sensor 100 can be improved.

In a variant wherein the connection between the temperature sensing element 102 and the cable 106 is realized by one or more intermediate wires having one end connected to each electrically conductive lead 104a, 104b of the temperature sensing element 102, and another opposite end connected to the terminal end 116a, 116b of each conductor wire 108a, 108b extending beyond the outer sheath 110 of the cable 106, the electrically insulating element 200 would comprise more than one aperture 210, such that each junction region is accessible by a corresponding aperture through the lateral surface 212 of the electrically insulating element 200.

The shape of the openings 206, 208 shown in FIG. 1*b* is respectively adapted to the shape of the portions of the cable 106 and of the temperature sensing element 102 to be inserted at least partially into the electrically insulating element 200. Hence, the temperature sensing element 102 and the cable 106 are adapted to be partially nested and retained in the respective first 206 and second 208 openings of the electrically insulating element 200 by form fit, force fit, press fit or friction fit connection. Therefore, the assembly of the electrically insulating element 200 with the cable 106 and the temperature sensing element 202 is simple and quick without the need for any tools or fastening devices.

As shown in FIG. 1*b*, the dimension of the first opening 206, i.e. the hollow cross-section C of the first opening 206 is adapted for accommodating the zig-zag configuration of the extended two conductor wires 108*a* (108*b* is not visible but it is also folded in a zig-zag configuration). In the said zig-zag configuration, each extended conductor wires 108*a*, 108*b* is curved such that to form angles a, b, c which are different from 0° and 180° between successive portions of each extended conductor wire 108*a*, 108*b*. According to a variant, the extended conductor wire 108*a*, 108*b* can be folded only once such as to have one angle a, being different from 0° and 180°, along its predetermined length l. In another variant, the extended conductor wire 108*a*, 108*b* can be folded several times such as to have more than one angle along its predetermined length l. In another variant, each extended conductor wire 108*a*, 108*b* is folded such as to have a spring shape. The folding of the extended conductor wires 108*a*, 108*b* is not limited to the configuration illustrated in FIG. 1*b*, which represents an example of the said zig-zag configuration of the extended conductor wires 108*a*, 108*b*.

As the elements surrounding and/or attached to the temperature sensor 100 are made of different materials (e.g. metal, ceramic), these elements have different thermal expansion coefficients causing them not to expand in a similar manner.

According to the first embodiment, the extended conductor wires 108*a*, 108*b* are folded a zig-zag configuration in a non-expanded state of the temperature sensor 100, such that the predetermined length l of the conductor wires 108*a*, 108*b* extending beyond the outer sheath 110 is smaller in the non-expanded state than in an expanded state of the temperature sensor 100 (see FIG. 3*b*). Hence, the connection at the junction region 120 can withstand the variation of dimension of the temperature sensor 100 or of any elements on which the temperature sensor 100 is mounted, caused by thermal expansion. Indeed, the predetermined length l of the extended conductor wires 108*a*, 108*b* are configured to accommodate a change in distance between the terminal end 114 of the cable 106 and the junction region 120. Hence, the predetermined length l of the conductor wires 108*a*, 108*b* provides a strain relief to the temperature sensor 100. As the strain relief is provided by the conductor wires 108*a*, 108*b* themselves, there is no need for adding any part, e.g. an additional wire, to ensure the strain relief function.

FIG. 1*c* represents a side view of a cross-section of the electrically insulating element 200 shown in FIGS. 1*a* and 1*b*. Hence, elements with the same the reference numeral already described and illustrated in FIGS. 1*a* and 1*b* will not be described in detail again but reference is made to their description above.

FIG. 1*c* illustrates a side view of the electrically insulating element 200 viewed from its end 202 and thus showing the first opening 206 of the electrically insulating element 200. As mentioned above, the first opening 206 is configured for receiving the cable 106 and its extended conductor wires 108*a*, 108*b*. The first opening 206 of the electrically insulating element 200 has a partition wall 222 that extends parallel to the direction of the longitudinal axis A such as to separate the hollow first opening 206 into two compartments 206*a*, 206*b*. Each of the compartments 206*a*, 206*b* is configured to accommodate each of the conductor wires 108*a*, 108*b* of the cable 106. According to the first embodiment, the partition wall 222 is formed integrally with the electrically insulating element 200 in an electrically isolative material, such as ceramic. The partition wall 222 enables preventing a short-circuit among the conductor wires 108*a*, 108*b* extending beyond the outer sheath 110 of the cable 106 without requiring any powder and fluid. Hence, the electrical insulation of the extended conductor wires 108*a*, 108*b* of the cable 106 can be achieved without any powder and fluid, used with conventional temperature sensors, which simplifies the structure and the manufacturing of the temperature sensor 100.

According to a variant, the first opening 206 may be a chamfered opening at the end 202 of the electrically insulating element 200 such as to improve the fitting of the cable 106 into the first opening 206.

According to the first embodiment shown in FIG. 1*c*, the partition wall 222 does not extend until the end 202 of the electrically insulating element 200. Hence, the first opening 206 is not separated into two compartments 206*a*, 206*b* right from the end 202, but further inside the electrically insulating element 200, e.g. at the cross-section represented by the double arrows on FIG. 1*b*. For example, the partition wall 222 does not extend in a chamfered area of the first opening 206.

In a variant wherein more than two conductor wires extends beyond the cable 106, the first opening 206 of the electrically insulating element 200 comprises a number of partition walls allowing to ensure the electrical insulation of each conductor wire to each other.

A method for assembling the temperature sensor 100 according to the first embodiment will be described in the followings with respect to the FIGS. 2*a* to 2*d*. Elements with the same the reference numeral already described and illustrated in FIGS. 1*a*-*c* will not be described in detail again but reference is made to their description above.

Figure 2A:
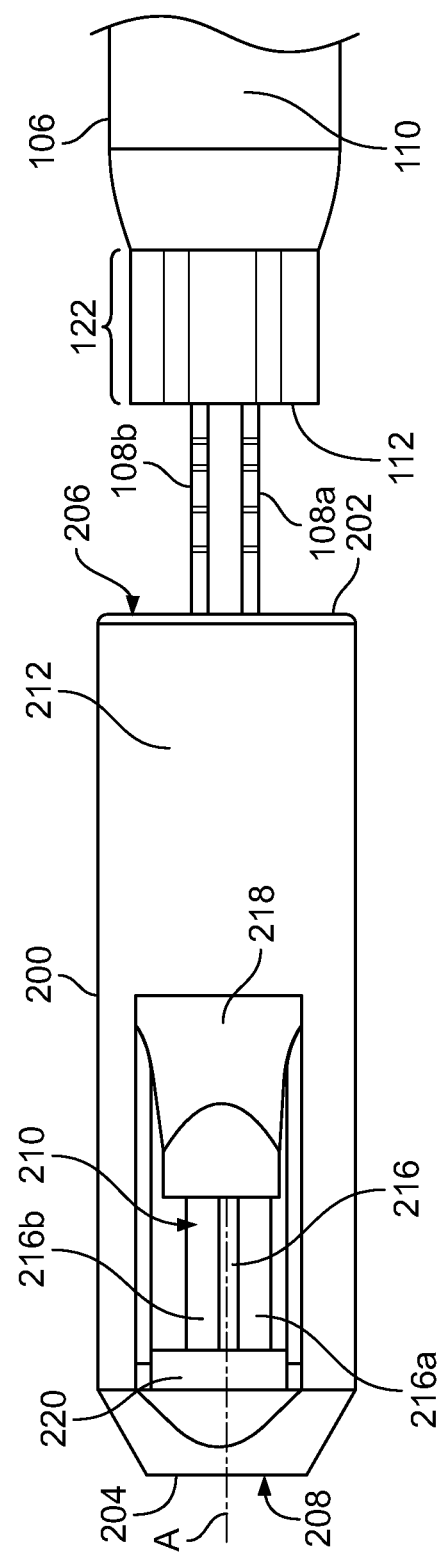

FIG. 2*a* is a top view of a first step of the method for assembling the temperature sensor 100 according to the first embodiment of the present invention. The cable 106 illustrated in FIG. 2*a* is represented according to an embodiment, wherein the portion 122 of the cable 106 to be nested in the electrically insulating element 200 has a hexagonal or other geometric cross-section. The first opening 206 having a circular cross-section, the portion 122 of the cable 106 is configured for preventing a rotation between the cable 106 and the electrically insulated element 200 by form-fit connection. As a result, the abrasive forces applied on the nested portion 122 of to cable 106 by a rotation of the cable 106 inside the opening 206 can be reduced.

Figure 2B:
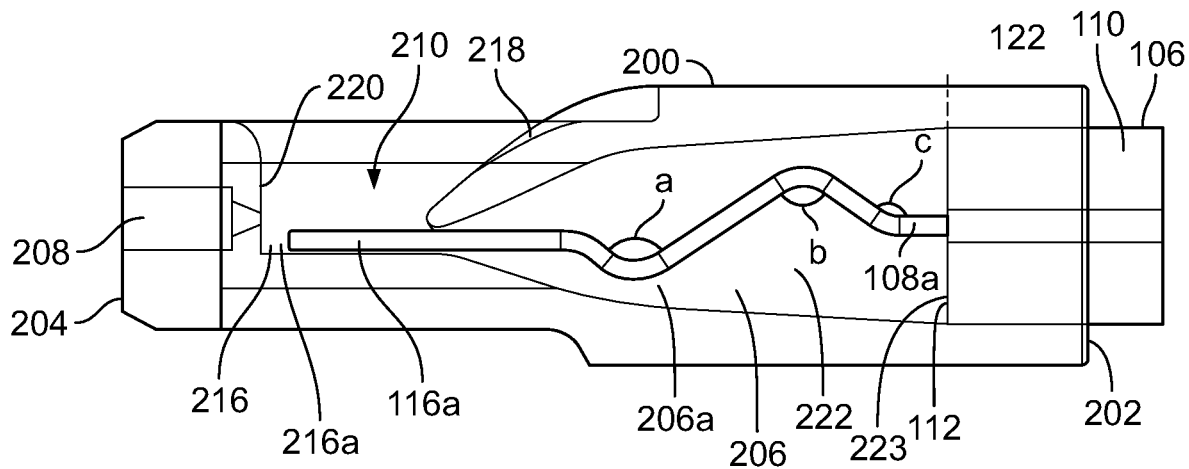
FIG. 2b is a sectional side view of a second step of the method.
Figure 2C:
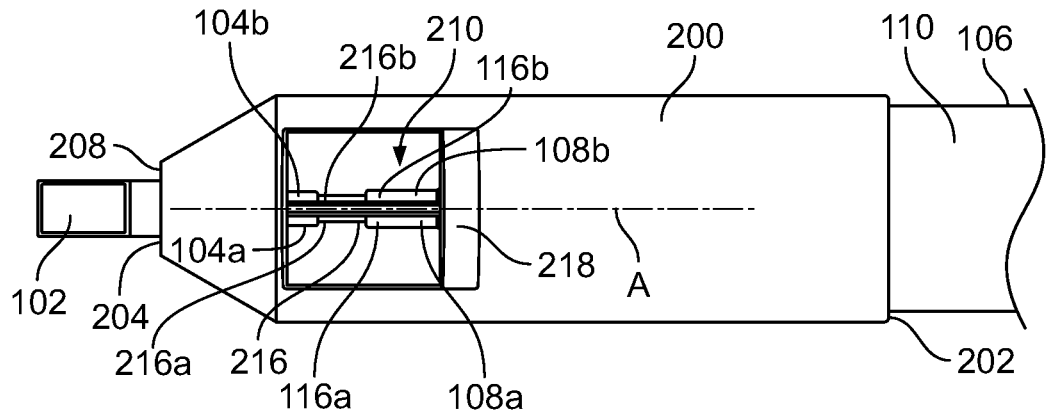
FIG. 2c is a top view of a third step of the method.
Figure 2D:
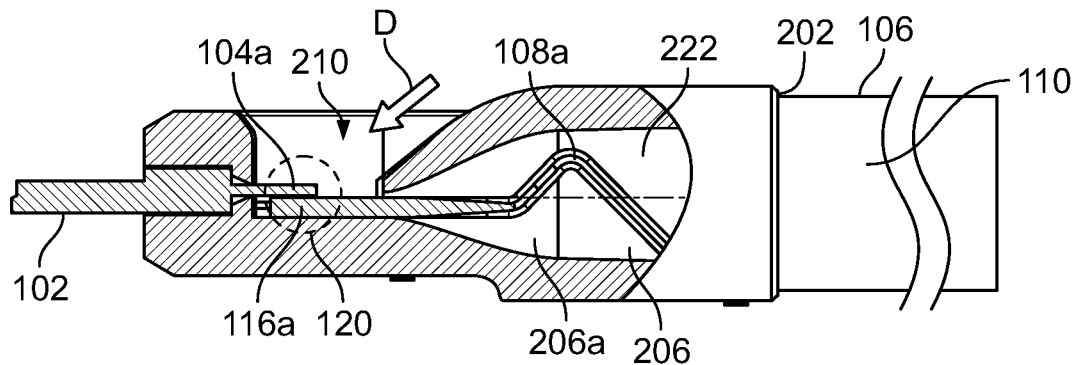
FIG. 2d is a sectional side view of a final step of the method.

The top view of the FIG. 2*a* allows showing, through the aperture 210, the bottom surface 216 of the electrically insulated element 200. As it can be seen in FIG. 2*a*, the bottom surface comprises two grooves 216*a*, 216*b* whose cross-sections are adapted to the dimension of the conductor wires 108*a*, 108*b*. The grooves 216*a*, 216*b* are configured for guiding and holding in position the terminal ends 116*a*, 116b of the conductor wires 108a, 108b as illustrated in FIGS. 2b-2d. Furthermore, the grooves 216a, 216b also allow electrically insulating the terminal ends 116a, 116b of the conductor wire 108a, 108b among each other at the bottom surface 216.

At the first step of the method for assembling the temperature sensor 100 shown in FIG. 2a, the two conductor wires 108a, 108b of the cable 106 and the cable 106 is inserted in the first opening 206 of the electrically insulating element 200.

FIG. 2b is a side view of a second step of the method for assembling the temperature sensor 100 according to the first embodiment of the present invention. In the following, the description of the terminal end 116a of the conductor wire 108a applies likewise to the terminal end 116b of the conductor wire 108b, which are not visible in the side view of FIG. 2b.

At the step illustrated by the FIG. 2b, the terminal end 116a of the conductor wire 108a is inserted in the compartment 206a of the opening 206 delimited by the partition wall 222. The terminal end 116a is moved until the bottom surface 216 of the aperture 210 of the electrically insulating element 200 and is positioned in the groove 216a. The portion of the extended conductor wire 108a folded in a zig-zag configuration is accommodated in the first opening 206 of the electrically insulating element 200. The portion 122 of the cable 106 having a hexagonal cross-section is nested in first opening 206 of the electrically insulating element 200 as far as the stop on a partition wall end 223 and held in position by form-fit connection.

The electrically insulating element 200 and its partition wall 222 in the first opening 206 enables preventing a short-circuit among the conductor wires 108a, 108b extending beyond the outer sheath 110 of the cable 106 without requiring any powder and fluid. Hence, the electrical insulation of the extended conductor wires 108a, 108b of the cable 106 can be achieved without any powder and fluid, used with conventional temperature sensors, which simplifies the structure and the manufacturing of the temperature sensor 100.

FIG. 2c is a side view of a third step of the method for assembling the temperature sensor 100 according to the first embodiment of the present invention. At the step illustrated by the FIG. 2c, the temperature sensing element 102 is partly inserted into the electrically insulating element 200 by the second opening 208. The temperature sensing element 102 is inserted such that its electrically conductive leads 104a, 104b overlap the terminal end 116a, 116b of the conductor wires 108a, 108b of the cable 106—already inserted inside 214 the electrically insulating element 200 at the preceding step.

The area wherein the electrically conductive leads 104a, 104b of the temperature sensing element 102 overlap the terminal end 116a, 116b of the conductor wires 108a, 108b of the cable 106 defines the junction region 120, shown in FIG. 2c. The connection between the temperature sensing element 102 and the cable 106 is to be realized at the junction region 120.

FIG. 2d is a side view of a fourth step of the method for assembling the temperature sensor 100 according to the first embodiment of the present invention. At the step represented by the FIG. 2d, the electrically insulating element 200 is mechanically assembled with the temperature sensing element 102 and the cable 106 respectively by force-fit and form-fit connections. Therefore, the electrically conductive leads 104a, 104b of the temperature sensing element 102 and the terminal end 116a, 116b of the conductor wires 108a, 108b of the cable 106 are held in position by the electrically insulating element 200. Hence, the junction region 120 can be stably maintained before the connection of the electrically conductive leads 104a, 104b with the terminal end 116a, 116b by welding, for instance. Furthermore, as the aperture 210 extends up to the junction region 120, the junction region 120 is accessible from the outside of the electrically insulating element 200 by a tool and/or an operator.

The method according to the present invention allows realizing the connection by laser welding after the conductor wires 108a, 108b of cable 106 have been electrically insulated and once the assembly, in particular the junction region 120, is stably held in position, both by the electrically insulating element 200. The connection at the junction region is mechanically secured against vibrations and shock by the electrically insulating element 200, which thus allows improving the robustness of the temperature sensor 100.

At the step illustrated in FIG. 2d, the connection at the junction region 120 is realized by directing a laser beam D towards the junction 120 and injecting an inert gas through the aperture 210 of the electrically insulating element 200. Consequently, each electrical lead 104a, 104b is connected to each terminal end 116a, 116b of the conductor wires 108a, 108b at the junction region 120. The grooves 216a, 216b on the bottom surface 216 of the electrically insulating element 200 allows to separate each connections and thus to avoid any short-circuit.

In summary, the present invention according to the first embodiment allows, by the electrically insulated element 200, replacing the ceramic powder filling which is used with conventional temperature sensors. Thereby, the electrical insulation of the extended conductor wires 108a, 108b of the cable 106 can be achieved without any powder and fluid, which simplifies the structure and the manufacturing of the temperature sensor 100. Furthermore, the electrically insulating element 200 allows preventing short-circuit among the conductor wires 108a, 108b extending out of the cable 106 as well as between the conductor wires extending 108a, 108b out of the cable 106 and the metal sheath 110 of the cable 106. The electrically insulating element 200 also provides support and guidance for positioning the electrically conductive leads 104a, 104b and the conductor wires 108a, 108b such that the junction region 120 is located at the aperture 210 of the electrically insulating element 200. Hence, the junction region 120 can be reliably positioned with respect to the electrically insulating element 200. Thus, the electrically insulating element improves manufacturability of the temperature sensor 100.

FIG. 3a and FIG. 3b represent a temperature sensor 300 according to a second embodiment of the present invention. FIG. 3a represents the temperature sensor 300 in a non-expanded state, while FIG. 3b represents the temperature sensor 300 in an expanded state. Such a temperature sensor 300 can, for instance, be used for measuring an exhaust gas temperature in an automobile.

The temperature sensor 300, as shown in FIGS. 3a and 3b, comprises a temperature sensing element 302 that is operable to transduce a sensed temperature into an electrical output signal. In an embodiment, the temperature sensing element 302 comprises a Pt200 sensor as the actual temperature detector. Platinum sensors are particularly advantageous because of their potential accuracy and long-term stability in the high temperature range. Most platinum sensing elements are currently in the form of thin film resistors. However, it is clear for a person skilled in the art that any other miniaturized temperature sensing element can be used according to the present invention as well. For instance, the temperature sensing element 302 may comprise a resistive temperature detector (RTD), a thermistor, or a silicon-based semi-conductor temperature sensor.

The electrical output signal is output at electrically conductive leads 304a, 304b of the temperature sensing element 302. The electrically conductive leads 304a, 304b are to be connected to a cable 306.

One automotive application of high temperature sensors is measuring, for instance, the temperature of exhaust gas. This means an aggressive atmosphere that might be reductive or oxidizing, contains sulfur, nitrogen, hydrogen, oxygen, and all kinds of compounds thereof. This in conjunction with the temperature determines materials for housings and fittings.

The cable 306 is, in the embodiment of FIGS. 3a and 3b, a mineral insulated cable 306. The mineral insulated cable 306 comprises two conductor wires 308a, 308b enclosed in a metal outer sheath 310. The two conductor wires 308a, 308b are insulated with respect to each other inside the cable 306 by powder or packed minerals 312. The outer sheath 310 protects the internal conductor wires 308a, 308b from heat, chemical or other environmental damage. The outer sheath 310 can be of stainless steel or Inconel®. The insulated packed minerals or powder 312 can be for instance made of magnesium oxide (MgO). Magnesium oxide makes an appropriate electrical insulation material because it is both chemically and physically stable at high temperatures.

At a terminal end 314 of the cable 306, the two conductor wires 308a, 308b extend beyond the outer sheath 310 thereof along a length l. In the following, the term "the extended conductor wires 308a, 308b" refers to the conductor wires 308a, 308b extension of length l. The respective terminal end 316a, 316b of the extended two conductor wires 308a, 308b are connected with the electrically conductive leads 304a, 304b of the temperature-sensing element 302 at the respective junction regions 320a, 320b.

According to the second embodiment shown in FIGS. 3a and 3b, the cable 306 has two conductor wires 308a, 308b to be connected with two respective electrically conductive leads 304a, 304b of the temperature sensing element 302. However, the number of conductor wires of the cable 306 as well as the number of electrically conductive leads of the temperature sensing element 302 are not limited to the number of two, and could be one and more.

According to the second embodiment, the extended conductor wires 308a, 308b are folded in a zig-zag configuration in the non-expanded state of the temperature sensor 300, as illustrated in FIG. 3a. In the zig-zag configuration, each extended conductor wires 308a, 308b is curved such that to form angles a, b, c which are different from 0° and 380° between successive portions of each extended conductor wire 308a, 308b. According to a variant, the extended conductor wire 308a, 308b can be folded only once such as to have one angle a, being different from 0° and 180°, along its predetermined length l. In another variant, the extended conductor wire 308a, 308b can be folded several times such as to have more than one angle along its predetermined length l. In another variant, each extended conductor wire 308a, 308b is folded such as to have a spring shape. Therefore, the folding of the extended conductor wires 308a, 308b is not limited to the configuration illustrated in FIG. 3a, which represents an example of the zig-zag configuration of the extended conductor wires 308a, 308b.

As the elements surrounding and/or attached to the temperature sensor 300 are made of different materials (e.g. metal, ceramic), these elements have different thermal expansion coefficients causing them not to expand in a similar manner. The predetermined length l of the conductor wires 308a, 308b extending beyond the outer sheath 310 of the cable is smaller in the non-expanded state, shown in FIG. 3a, than in the expanded state of the temperature sensor 300 represented in FIG. 3b. In FIG. 3b, in the expanded state, the length L of the extended conductor wires 308a, 308b is greater than the predetermined length l.

The connection at the junction region 320 can withstand the variation of dimension of the temperature sensor 300 or of any elements on which the temperature sensor 300 is mounted, caused by thermal expansion. For instance, the thermal expansion of a protective housing of the temperature sensor 300, may pull the temperature sensing element 302 away from the terminal end 314 of the cable 306, as represented by the arrow F in FIG. 3b. Hence, the predetermined length l of the extended conductor wires 308a, 308b are configured to accommodate a change in distance between the terminal end 314 of the cable 306 and the junction region 320. Hence, the predetermined length l of the conductor wires 308a, 308b provides a strain relief to the temperature sensor 300. As the strain relief is provided by the conductor wires 308a, 308b themselves, there is no need for adding any part, e.g. an additional wire, to ensure the strain relief function.

Furthermore, according to the second embodiment, the connection between the temperature sensing element 302 and the cable 306 at the junction regions 320a, 320b is realized directly between each electrically conductive lead 304a, 304b and each respective conductor wire 308a, 308b. Therefore, in contrast with conventional temperature sensors wherein one or more intermediate additional wires are used to connect the temperature sensing element 302 with the cable 306, the number of connections, and thus of junction regions, can be reduced. This allows improving the robustness of the temperature sensor 300 as the number of weldings is reduced, which enhances the reliability of the connection. Furthermore, by removing the necessity of using additional intermediate wires, the number of components of the temperature sensor 300 can be reduced as well as the process step associated with the intermediate wires (e.g. straightening step, welding and cutting step of the intermediate wires). In summary, the second embodiment of the present invention allows improving the manufacturing and the reliability of such a temperature sensor.

The second embodiment of the present invention can be combined with the first embodiment and/or with any of the variants described above with respect to FIGS. 1a-c and 2a-2d.

Although the embodiments have been described in relation to particular examples, the invention is not limited and numerous alterations to the disclosed embodiments can be made without departing from the scope of this invention. The various embodiments and examples are thus not intended to be limited to the particular forms disclosed. Rather, they include modifications and alternatives falling within the scope of the claims and individual features can be freely combined with each other to obtain further embodiments or examples according to the invention.

What is claimed is:

1. A temperature sensor, comprising:
  a temperature sensing element transducing a sensed temperature into an electrical output signal and having a plurality of electrically conductive leads;
  a mineral insulated cable having a plurality of conductor wires enclosed by a metal outer sheath, the conductor wires are insulated with respect to each other inside the cable and extend beyond the outer sheath at a terminal end of the cable, the electrically conductive leads are connected to the conductor wires extending beyond the outer sheath at a junction region; and an electrically insulating element insulating the conductor wires extending beyond the outer sheath at least partially with respect to each other and with respect to the outer sheath, the electrically insulating element having a first opening receiving the conductor wires extending beyond the outer sheath and a second opening at least partially receiving the temperature sensing element, the junction region is located within the electrically insulating element and the electrically insulating element has an aperture extending up to the junction region.

2. The temperature sensor of claim 1, wherein the electrically insulating element has an essentially elongate cylindrical shape and has the first opening at a first and the second opening at an opposite longitudinal end.

3. The temperature sensor of claim 2, wherein the aperture extends perpendicularly to a longitudinal axis of the electrically insulating element.

4. The temperature sensor of claim 2, wherein the first opening extends towards the junction region and has a partition wall insulating the conductor wires extending beyond the outer sheath with respect to each other.

5. The temperature sensor of claim 1, wherein an inner surface of the electrically insulating element has a plurality of grooves at the junction region, a plurality of terminal ends of the conductor wires extending beyond the outer sheath are positioned in the grooves.

6. The temperature sensor of claim 1, wherein the electrically conductive leads extending beyond the outer sheath each overlap one of the conductor wires in the junction region.

7. The temperature sensor of claim 1, wherein a connection between the temperature sensing element and the cable is laser welded in the junction region.

8. The temperature sensor of claim 1, wherein the cable and the temperature sensing element are partially nested and retained in the first opening and the second opening of the electrically insulating element by force fit, press fit or friction fit connection.

9. The temperature sensor of claim 1, wherein a portion of the cable nested in the electrically insulating element has a geometric shape preventing a rotation between the cable and the electrically insulating element by a form-fit connection.

10. The temperature sensor of claim 1, wherein the electrically insulating element is manufactured from a ceramic material.

11. The temperature sensor of claim 1, wherein the electrically insulating element integrally formed in one piece.

12. A temperature sensor, comprising:
a temperature sensing element transducing a sensed temperature into an electrical output signal and having a plurality of electrically conductive leads; and
a mineral insulated cable having a plurality of conductor wires enclosed by a metal outer sheath, the conductor wires are insulated with respect to each other inside the cable and extend beyond the outer sheath at a terminal end of the cable with a predetermined length, the electrically conductive leads are connected to the conductor wires extending beyond the outer sheath at a junction region, the conductor wires extending beyond the outer sheath are at least partially curved or folded in a zigzag shape in a non-expanded state of the temperature sensor, the predetermined length of the conductor wires extending beyond the outer sheath is smaller in the non-expanded state than in an expanded state of the temperature sensor.

13. The temperature sensor of claim 12, wherein a connection between the temperature sensing element and the cable is formed by an intermediate wire having a first end connected to the electrically conductive leads and an opposite second end connected to a plurality of terminal ends of the conductor wires extending beyond the outer sheath.

14. The temperature sensor of claim 12, wherein a connection between the temperature sensing element and the cable is formed directly between each electrically conductive lead and one of the conductor wires.

15. The temperature sensor of claim 14, wherein one junction region is formed between each electrically conductive lead and one of the conductor wires.

16. A method for assembling a temperature sensor, comprising:
providing a temperature sensing element transducing a sensed temperature into an electrical output signal, the temperature sensing element having a plurality of electrically conductive leads;
providing a mineral insulated cable having a plurality of conductor wires enclosed by a metal outer sheath, the conductor wires are insulated with respect to each other inside the cable and extend beyond the outer sheath at a terminal end of the cable;
providing an electrically insulating element having a first opening and a second opening;
inserting the cable in the first opening such that the conductor wires extending beyond the outer sheath are positioned inside the electrically insulating element;
inserting the temperature sensing element in the second opening such that the electrically conductive leads are positioned inside the electrically insulating element and overlap the conductor wires at a junction region; and
connecting the electrically conductive leads to the conductor wires at the junction region through an aperture of the electrically insulating element extending up to the junction region.

17. The method of claim 16, wherein the inserting step of the cable includes positioning the conductor wires in a plurality of grooves of an inner surface of the electrically insulating element.

18. The method of claim 16, wherein the connecting step includes laser welding the electrically conductive leads to the conductor wires by directing a laser beam towards and injecting an inert gas through the aperture.

19. The method of claim 16, wherein the inserting steps include holding the cable and the temperature sensing element in position in the first opening and the second opening by a force fit connection, a press fit connection, a friction fit connection and/or a form-fit connection.

* * * * *